June 19, 1934.   J. W. WEST   1,963,768
CUTTING AND PUNCHING MACHINE FOR FROZEN CONFECTIONS
Filed Aug. 11, 1933   4 Sheets-Sheet 1
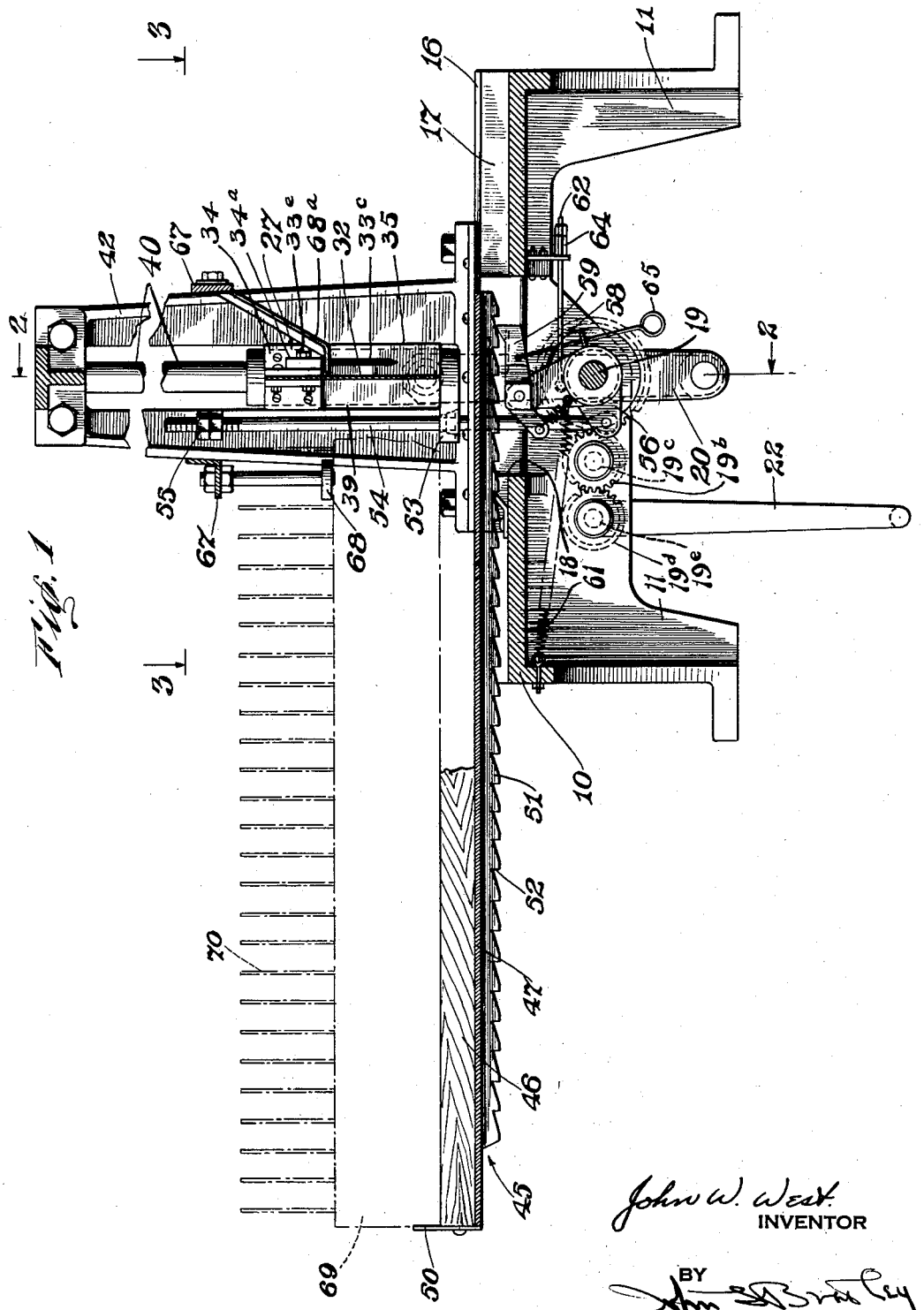
John W. West
INVENTOR
BY
HIS ATTORNEY June 19, 1934.  J. W. WEST  1,963,768
CUTTING AND PUNCHING MACHINE FOR FROZEN CONFECTIONS
Filed Aug. 11, 1933   4 Sheets-Sheet 2
Fig. 2
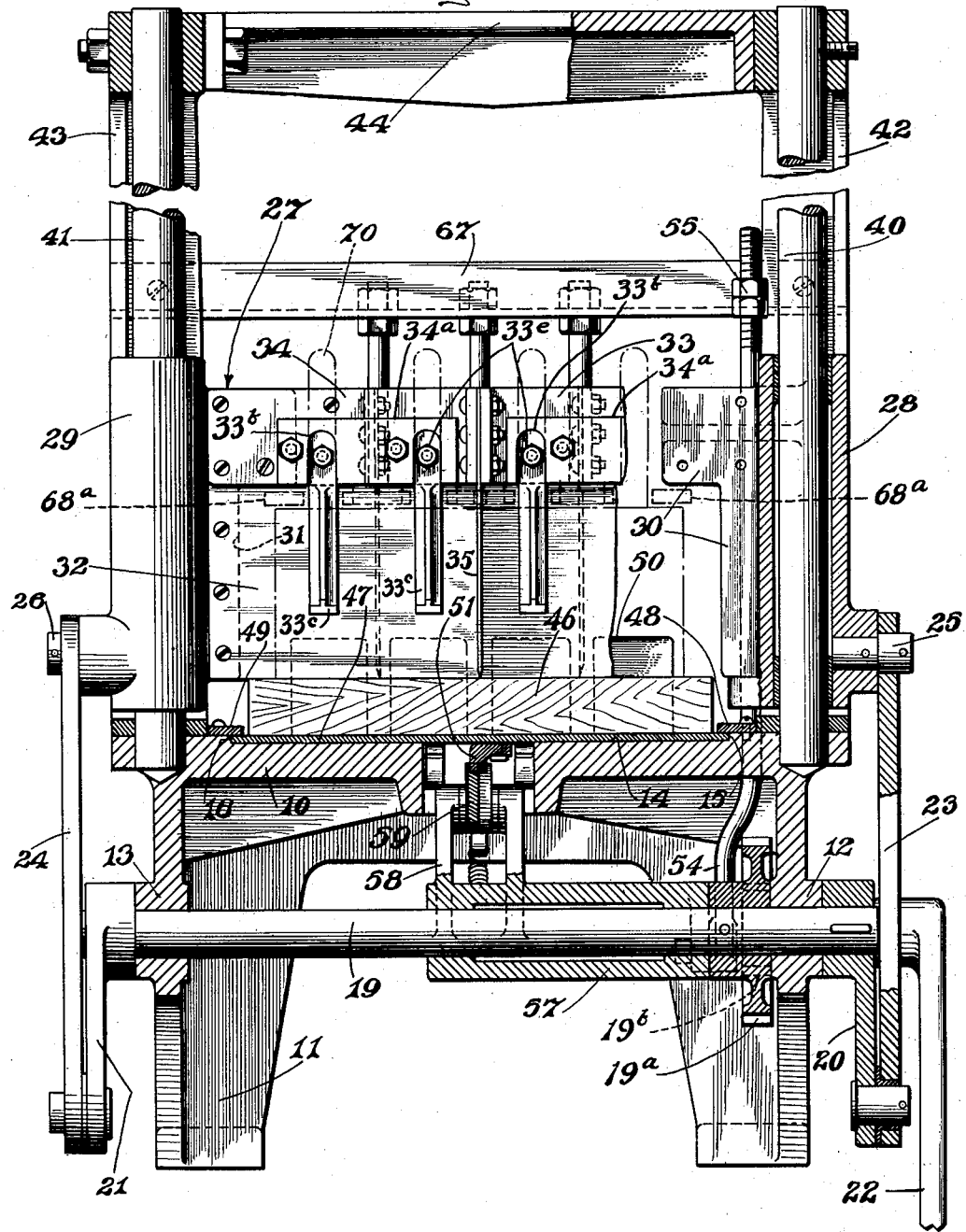
John W. West
INVENTOR
his ATTORNEY June 19, 1934.  J. W. WEST  1,963,768
CUTTING AND PUNCHING MACHINE FOR FROZEN CONFECTIONS
Filed Aug. 11, 1933  4 Sheets-Sheet 3

John W. West
INVENTOR

BY
his ATTORNEY

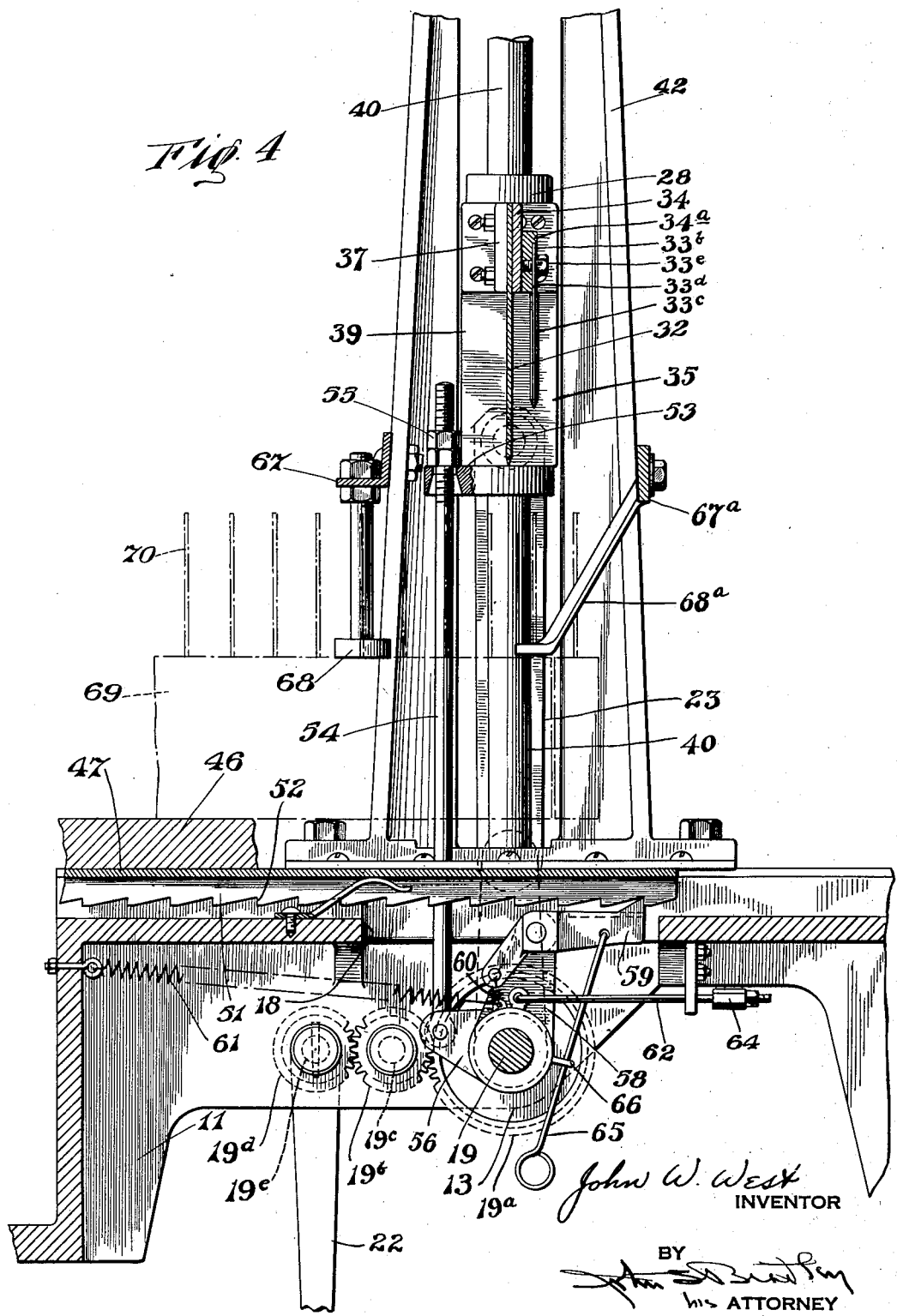

Patented June 19, 1934

1,963,768

UNITED STATES PATENT OFFICE 1,963,768

CUTTING AND PUNCHING MACHINE FOR FROZEN CONFECTIONS

John W. West, Maplewood, N. J.

Application August 11, 1933, Serial No. 684,637

5 Claims. (Cl. 107—8)

This invention relates to cutting and punching machines, and more particularly to machines for operating upon edible confections, such as ice cream on sticks.

A general object of the invention is the provision of a cutting and punching machine of this type which has generally useful and improved characteristics which enable it to satisfy, to a greater extent than did previously available machines, the manufacturing requirements encountered in its intended field.

More particular objects of the invention are the provision of a cutting machine which is capable of accurately and rapidly dividing a mass of stick equipped ice cream into individual units each having a stick or handle, and also to provide a machine capable of dividing the mass of ice cream without sticks into individual units and providing each unit with a centrally positioned hole or recess into which a stick may be inserted later. The machine is rugged and simple in operation while yielding a very satisfactory output volume, and manufactured at relatively low cost.

For a fuller understanding of the nature and objects of the invention, reference should be had to the following detailed description taken in connection with the accompanying drawings, in which Figure 1 is a central longitudinal vertical sectional view along the longitudinal center line of a cutting and punching machine embodying features of the invention, certain parts being broken away more completely and compactly to show the construction;

Fig. 2 is a transverse vertical sectional view substantially corresponding to line 2—2 of Fig. 1;

Fig. 4 is an enlarged vertical sectional view substantially similar to Fig. 1, but showing the vertically reciprocal cross-head and its associated parts in a different portion of their stroke.

Figure 3:
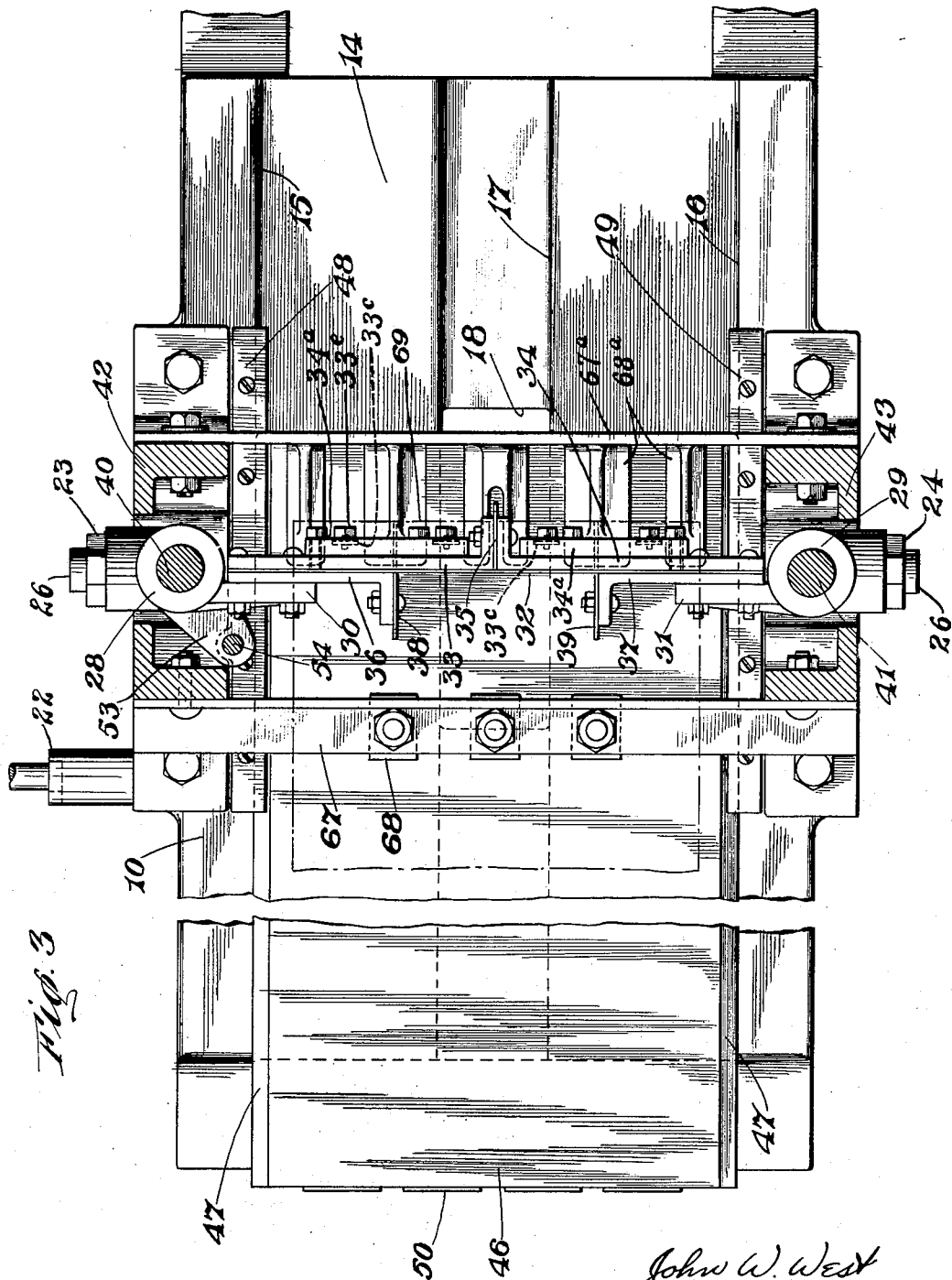
Fig. 3 is a horizontal sectional view substantially corresponding to line 3—3 of Fig. 1.

The embodiment of the invention herein specifically described and illustrated is particularly adapted to the manufacture of a well known type of frozen confection comprising a chocolate coated block of ice cream having a stick or handle frozen therein. However, the scope of the present application is not limited specifically thereto inasmuch as various other uses and embodiments will readily occur to those skilled in the art.

In accordance with one practice utilized in the manufacture of stick equipped ice cream confections, a mass of ice cream is hardened in a substantially rectangular mold of such size that it turns out a comparatively large block of frozen cream which is adapted to be divided both longitudinally and transversely into a number of smaller individual units. Sometimes sticks or handles are previously frozen into the ice cream block in such a way as to be accurately centered in the individual units after cutting, and sometimes the sticks are inserted after the individual units are cut. In the latter case it is usually the practice to punch a hole or recess in the unit into which the stick can be inserted. The machine of this invention may be used for either method of manufacture or for the simple division of a block of ice cream into units without sticks or handles.

Referring more particularly to the drawings, it will be seen that the machine comprises a base 10, preferably in the form of a casting, having legs 11 at the corners thereof, and having cast integrally therewith centrally located depending journal bearings 12 and 13. The upper surface of base 10 is provided with a guide channel 14 having side guide walls 15 and 16, and having a relatively depressed central groove 17. An opening 18 extends through base 10 near the central part of this groove 17. Guide channel 14 with its depressed groove 17 is adapted to cooperate with a feed board which will be hereinafter described.

Rotatably mounted in journals 12 and 13 is a drive shaft 19 having a gear 19$^a$ which meshes with an intermediate gear 19$^b$ rotatably mounted upon a suitable stub shaft 19$^c$. Gear 19$^b$ meshes also with another gear 19$^d$ keyed to a shaft 19$^e$ upon the outer end of which is fixed an operating crank 22. Of course any other suitable driving means either manual or power may be employed.

Upon the ends of shaft 19 which project beyond the journals 12 and 13 are keyed crank arms 20 and 21. A pair of pitmen 23 and 24 are respectively pivotally connected to crank arms 20 and 21, and respectively have their upper ends pivotally connected to outwardly projecting trunnions 25 and 26 on a vertically reciprocal cross-head generally designated 27. This cross-head comprises a pair of vertically slidable spaced sleeve castings 28 and 29, which are each provided with inwardly projecting wings 30 and 31 across which is fastened a spanning knife blade assembly, most clearly shown in Figs. 3 and 2. This knife assembly shown comprises a transversely extending blade 32 extending from wing 30 to wing 31, and reinforced at the upper portion of one face by relatively stout angular knife braces 33 and 34, between the juxtaposed angularly bent ends of which is fastened a longitudinally extending quartering knife blade 35. Along the upper portion of the opposite face of blade 32 extend additional angular knife braces 36 and 37 which, respectively, carry additional quartering blades 38 and 39. It will be understood, of course, that instead of quartering blades the knife assembly may carry blades adapted to cut 2, 3, or any desired number of pieces and these blades may be positioned on one or both sides of the transverse blade in any desired and suitable arrangement.

The sleeves 28 and 29 of the cross-head are slidably guided on cylindrical guide posts 40 and 41, which latter have their lower ends firmly mounted in base 10 (Fig. 2) and have their upper ends held fixed by upright standards 42 and 43 which, respectively, are firmly bolted against seats located on opposite sides of base 10. These standards are rigidly braced by a cross-strut 44.

Attached to braces 33 and 34 respectively, on either side of blade 35 are blocks 33$^a$ and 34$^a$. Each of these blocks is provided with a recess 33$^b$ for receiving the butt of a punch 33$^c$. Each punch shown is of cruciform cross-section, a shape particularly effective for punching holes for flat sticks, and has a flattened butt 33$^d$ which fits recess 33$^b$ and is held rigidly but removably therein by a bolt 33$^e$. Each punch is, of course, positioned so that it will penetrate the confection unit beneath along its major vertical axis.

The lower ends of the punches lie in a plane above that of the cutting edges of the knives so that the knives will enter the ice cream before the punches and will also sever the units completely while the ends of the punches are still embedded in the units.

A feed board generally designated 45 is provided for sliding movement along the guide channel 14 of base 10. This board comprises a body portion 46, which preferably is of wood, having extending across and entirely covering its under side a metallic bottom plate 47 which laterally projects therebeyond to form guide flanges whose edges abut the guide walls 15 and 16 for guiding cooperation therewith. A pair of overhanging plates 48 and 49 are centrally located on base 10 at opposite sides of guide channel 14 and serve to overlie such lateral flanges on bottom plate 47 to confine the feed board against undesired upward movement. A series of identical transversely spaced end plates 50 are fastened to the rear of the feed board so as to have their upper portions projecting vertically above the upper surface thereof. These end plates serve to locate the block of ice cream with respect to the upper surface of the feed board on which it rests, and the gaps between spaced plates accommodate the quartering blades during the final cutting strokes of the machine, as will more clearly appear hereinafter. If desired, a single notched or serrated plate may be substituted for the several plates 50. A rack 51 is fastened longitudinally and medially along the under side of the feed board, being accommodated by groove 17 hereinbefore mentioned. This rack has teeth 52 which are regularly spaced therealong, the distance between two successive teeth corresponding to that through which it is desired to advance the feed board during each of its step by step feed movements, about to be described.

The working motion for imparting a feeding movement to board 46 is derived from cross-head 27. To this end such cross-head is provided with a perforated lug 53 which preferably is cast integrally with the lower portion of one of the cross-head sleeves such as 28. A substantially vertically located actuating link or rod 54 is slidably threaded through the perforation in this lug, and has screwed over its threaded upper end a pair of adjustable lock nuts 55 which are adapted to be engaged and picked up by lug 53 during upward movement of the cross-head. The lower end of link 54 is pivotally connected to one arm 56 of a bell crank lever 57 which is freely rotatable on drive shaft 19 for independent rotation with respect thereto. Another bell crank lever arm 58, having the bifurcated construction illustrated in Fig. 2, is located on lever 57 at a point located transversely inwardly from arm 56, arm 58 being approximately in the medial longitudinal plane of the cutting machine. A drive pawl 59 is pivotally mounted on lever arm 58 and is located directly beneath rack 51 of the feed board. This pawl is given a normal upward bias into the path of such rack by means of a tension spring 60 extending between one end thereof and the body of bell crank lever 57. This bell crank lever itself is given a normal bias in a counter-clockwise direction by means of a tension spring 61 connected between base 10 and the body of the bell crank lever (Fig. 2). In order to limit the effect of spring 61 on this bell crank lever, an arresting link 62 is connected therewith, and is passed through a perforated lug 63 which is attached to base 10. Lock nuts 64 on link 62 engage this lug to afford a definite limit to the possible counter-clockwise movement of lever 57. To facilitate adjustment of the feed board 46 pawl 59 is provided with a releasing rod 65 running through guide 66 by means of which pawl 59 may be disengaged from rack 51 whenever desired.

A stripper bracket 67 spans standards 42 and 43 and has depending therefrom a plurality of strippers 68 which are vertically adjustable by virtue of a lock nut connection to bracket 67. These strippers closely overlie the block of ice cream on the feed board, and prevent undesired upward bouncing or dragging thereof.

On the other side of the knife assembly another stripper bracket 67$^a$ spans standards 42 and 43, and also has depending therefrom a plurality of strippers 68$^a$. These strippers are shown in the preferred although not essential form at 69$^a$. They are positioned immediately above and closely overlying the ice cream and are spaced apart sufficiently to permit the punches to pass between them. This spacing will also permit the sticks to pass when the punches are not used and the machine is employed for cutting up a block of ice cream already equipped with sticks for the individual confection units.

The operation of the machines is as follows. A block 69 of hard frozen ice cream is centrally positioned on the upper face of the feed board with its rear face abutting and located by the feed board end plates 50. After it is thus located, the feed board is introduced into guide channel 14, the bottom plate 47 being slid between guide walls 15 and 16 and beneath the overhanging plates 48 and 49, this manual introduction of the feed board being continued until the foremost rack tooth 52 passes beyond pawl 59. Rotation of crank 22 is now begun, whereby vertical reciprocation of cross-head 27 is effected through the agency of pitmen 23 and 24. As the cross-head approaches the upper portion of its vertical stroke, lug 53 picks up the lock nuts 55 on actuating link 54 and elevates the latter, whereby bell crank lever 57 is forced to rotate in a clockwise direction, thus moving drive pawl 59 from left to right as viewed in Figs. 1 and 4, so as to impart a forward advance movement to the rack and to the feed board. The pawl 59 will continue to advance until the cross-head 27 reaches its uppermost limit of movement, after which the cross-head will descend and lug 53 will tend to drop away from lock nuts 55, enabling spring 61 to return the bell crank lever 57 to its normal position, where it will be arrested by link 62. It will be seen that the total distance travelled by the drive pawl thus is dependent upon the location of lock nuts 64 and 55, and that the foremost point of advanace to which the pawl is enabled to go is determined by the position of lock nuts 55 along actuating link 54. This total distance travelled by the feed pawl will be at least as great as and preferably somewhat greater than the distance between two successive rack bar teeth, so that the step by step distance advanced by the board during each intermittent feeding movement will correspond exactly to the length of one rack tooth. Since lug 53 is located adjacent the lower edge of the cutting blades and lock nuts 55 are located somewhat above the upper ends of the sticks 68 in the block of ice cream, it follows that there can be no feeding movement of the feed board until the knife blade 32 has been raised sufficiently to clear the sticks. That is, feeding movement of the board through link 54, lever 57 and pawl 59 occurs only during about the final three-quarters of an inch of the upstroke of the cross-head, after the blade 32 has cleared the material on the feed board. Continued rotation of crank 22 will effect continued intermittent feeding of the feed board and its load, and during each rotation of the crank there will be a descending cutting stroke by transverse blade 32 and the various quartering blades 35, 38 and 39, whereby the block of ice cream is severed both transversely and longitudinally into a plurality of individual units. As clearly appears from Fig. 3 of the drawings, the quartering blades 38 and 39 will be the first to slice into the advancing ice cream block during the initial effective cutting stroke, while transverse blade 32 and quartering blade 35 do not slice until the next subsequent down stroke. The final cutting stroke at the end of the feeding and cutting operation is delivered by quartering blade 35, the spaces between end plates 50 accommodating blades 38 and 39 at such time. When stick equipped material is being cut, the distance between successive rack teeth 52 is, of course, equivalent to that between successive transverse rows of sticks 70. These ice cream blocks 69 are of uniform over all length, and their advance face consequently is a constant distance ahead of back plates 50. Lock nuts 55 are so located with respect to the back plates 50 and the rack 51 that the initial slicing stroke of blade 32 will occur exactly between the first two transverse rows of these sticks, along a transverse line spaced a distance of exactly one rack tooth behind the advance face of block 69. The punches 33c are, of course, removed when such stick equipped material is being cut.

When it is desired to cut up a plain block of ice cream into simple individual units without sticks the machine operates in exactly the same manner. Its operation is identical also when the individual units are to be provided with holes or recesses for the later insertion of sticks with the exception that the punches 33c are then used. As already stated these punches are all located on knife braces 33 and 34 so that they operate simultaneously with the severing of the individual units from the block of ice cream and upon the units being severed. Since the holes or recesses do not extend entirely through the units, whereas the knives must pass completely through, the lower end of each punch is somewhat above the lower edge of each cutter. This arrangement also provides the additional advantage that any compression or other displacement of the ice cream caused by the cutter will occur ahead of the entry of the punch into the part affected with the result that the holes formed by the punches will be substantially true and uniform and there will be no enlargement of the upper parts of the holes due to displacement of the ice cream after the punches have entered.

The punches being mounted upon the same braces 33 and 34 as knife 35 they will, of course, be drawn out of the individual units when the knives are raised during the upward travel of cross-head 27. Thus the punches will leave the ice cream units before the cutting blades 32 and 35 which, together with strippers 68a partially surround the ice cream units and counteract satisfactorily any tendency towards displacement.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. A cutting device, comprising, in combination, a base, a feed board slidable along said base, a rack on said board, a pair of upright guide standards on said base, a knife bearing cross-head slidable along said standards and adapted to divide material on said board, a perforate eye element carried by said cross head, means for reciprocating said cross-head, a rockable bell crank lever mounted on said base, a pawl pivoted on one arm of said lever for driving engagement with said rack, an actuating link having one end fastened to the remaining arm of said bell crank lever, and having its other end passing through said eye element and a limit stop fixed on said link which is adapted to be picked up and moved by said eye element during the latter part of the upstroke of said cross-head.

2. A cutting device, comprising, in combination, a base having a guideway, upstanding cross-head guides on opposite sides of said guideway, a knife bearing cross-head slidable on said upstanding guides, a crank shaft journaled in said base, a hand crank on said shaft, a pitman connecting said crank and said cross-head, a feed board slidable along said guideway, a rack on said board, a bell crank lever freely rotatable on said crank shaft, a drive pawl pivoted to one arm of said lever and biased into the path of said rack, and an actuating link fastened to another arm of said lever and having a loose motion connection with said cross-head.

3. A cutting device, comprising, in combination, a base having a guideway, upstanding guide columns on opposite sides of said guideway, a cross-head comprising a pair of sleeves each slidable on one of said columns and a knife structure spanning said sleeves, a perforate eye element on one of said sleeves, a crank shaft journaled in said base and disposed transversely thereacross, a pair of crank arms fixed to opposite ends of said shaft, a pair of pitmen each respectively connecting one of said cranks to one of said sleeves, means for rotating said crank shaft, a feed board slidable along said guideway, a rack on said feed board, a bell crank lever freely rotatable on said crank shaft, a drive pawl pivoted to one arm of said lever and adapted drivingly to engage said rack, an actuating link fastened to another arm of said lever and having its end passing through said eye element, stop means fixed on said link adapted to be picked up and moved by said element during a portion only of the movement of said cross-head whereby said pawl may be moved in one direction, and means for returning said pawl in the opposite direction.

4. A cutting and recess forming device comprising in combination a base, a feed board slidable along said base, a rack on said board, a pair of upright guide standards on said base, a crosshead slidable along said standards and provided with a knife adapted to divide material on said board, said cross-head also being provided with means for forming a recess suitable for the reception of a stick in the material so divided and simultaneously with such division, a perforate eye element carried by said cross-head, means for reciprocating said cross-head, a rockable bell crank lever mounted on said base, a pawl pivoted on one arm of said lever for driving engagement with said rack, an actuating link having one end fastened to the remaining arm of said bell crank lever, and having its other end passing through said eye element and a limit stop fixed on said link which is adapted to be picked up and moved by said eye element during the latter part of the upstroke of said cross-head.

5. A cutting and recess forming device comprising in combination a base having a guideway, upstanding cross-head guides on opposite sides of said guideway, a knife and punch-bearing crosshead slidable on said upstanding guides, a crank shaft journaled in said base, a hand crank on said shaft, a pitman connecting said crank and said cross-head, a feed board slidable along said guideway, a rack on said board, a bell crank lever freely rotatable on said crank shaft, a drive pawl pivoted to one arm of said lever and biased into the path of said rack, and an actuating link fastened to another arm of said lever and having a loose motion connection with said cross-head.

JOHN W. WEST.